(12) United States Patent
Gluck

(10) Patent No.: US 10,006,642 B2
(45) Date of Patent: Jun. 26, 2018

(54) SYSTEMS AND METHODS FOR CONTROLLING CONDITIONED FLUID SYSTEMS IN A BUILT ENVIRONMENT

(71) Applicant: Jerritt L. Gluck, Oyster Bay, NY (US)

(72) Inventor: Jerritt L. Gluck, Oyster Bay, NY (US)

( * ) Notice: Subject to any disclaimer, the term of this patent is extended or adjusted under 35 U.S.C. 154(b) by 369 days.

(21) Appl. No.: 14/709,466

(22) Filed: May 11, 2015

(65) Prior Publication Data

US 2015/0323200 A1    Nov. 12, 2015

Related U.S. Application Data

(60) Provisional application No. 61/991,285, filed on May 9, 2014.

(51) Int. Cl.
| | | |
|---|---|---|
| *F24D 1/02* | (2006.01) | |
| *F24D 19/10* | (2006.01) | |
| *F22B 1/00* | (2006.01) | |
| *F24D 5/04* | (2006.01) | |

(52) U.S. Cl.
CPC ............... *F24D 1/02* (2013.01); *F22B 1/00* (2013.01); *F24D 5/04* (2013.01); *F24D 19/1003* (2013.01); *Y02B 30/16* (2013.01)

(58) Field of Classification Search
USPC ........................................................ 237/9 R
See application file for complete search history.

(56) References Cited

U.S. PATENT DOCUMENTS

| | | |
|---|---|---|
| 1,493,409 A | 5/1924 | Wiley |
| 1,673,648 A | 6/1928 | Svenson |
| 1,804,167 A | 5/1931 | Keeney |
| 1,956,003 A | 4/1934 | Burrell |
| 1,984,509 A | 12/1934 | Wingard |
| 2,062,565 A | 12/1936 | Ferguson et al. |
| 2,101,316 A | 12/1937 | Kettnich |

(Continued)

FOREIGN PATENT DOCUMENTS

| | | |
|---|---|---|
| CN | 201502716 U | 6/2010 |
| EP | 0844468 A1 | 5/1998 |

(Continued)

*Primary Examiner* — Alissa Tompkins
*Assistant Examiner* — John Bargero
(74) *Attorney, Agent, or Firm* — Carter, DeLuca, Farrell & Schmidt, LLP

(57) ABSTRACT

The systems and methods of this disclosure control the flow rate of conditioned fluid at thermal distribution devices and at a conditioned fluid source that supplies conditioned fluid to the thermal distribution devices. The systems include multiple thermal distribution devices disposed throughout multiple rooms of a building, a fluid flow control device in fluid communication with each of the thermal distribution devices, multiple sensors disposed on each of the thermal distribution devices, a room temperature sensor disposed in each of the rooms, a first controller coupled to each of the fluid flow control devices, and a second controller coupled to a source of conditioned fluid. The first controllers control respective fluid flow control devices based on the measurement data obtained from the sensors and the room temperature sensors and a second controller controls the conditioned fluid source based on the demand for conditioned fluid by the thermal distribution devices.

14 Claims, 13 Drawing Sheets

(56) References Cited

U.S. PATENT DOCUMENTS

| | | |
|---|---|---|
| 2,125,662 A | 8/1938 | Work |
| 2,146,731 A | 2/1939 | Goodale |
| 2,163,909 A | 6/1939 | Lasher et al. |
| 2,190,197 A | 2/1940 | Simpson |
| 2,368,712 A | 2/1945 | Jehle et al. |
| 2,396,400 A | 3/1946 | Vitagliano |
| 2,724,400 A | 11/1955 | Ruffer |
| 2,788,177 A | 4/1957 | Reader et al. |
| 3,067,945 A | 12/1962 | Semonsen |
| 3,141,613 A | 7/1964 | Semonsen |
| 3,171,596 A | 3/1965 | Furlong et al. |
| 3,196,898 A | 7/1965 | Semonsen |
| 3,342,411 A | 9/1967 | Quist |
| 3,563,511 A | 2/1971 | Bentley-Leek |
| 3,686,857 A | 8/1972 | Berg |
| 4,665,544 A | 5/1987 | Honda et al. |
| 4,669,655 A | 6/1987 | Moller |
| 4,997,029 A | 3/1991 | Otsuka et al. |
| 5,595,342 A | 1/1997 | McNair et al. |
| 5,704,545 A | 1/1998 | Sweitzer, Jr. |
| 6,167,316 A | 12/2000 | Gloudeman et al. |
| 6,454,179 B1 | 9/2002 | Neve et al. |
| 6,788,980 B1 | 9/2004 | Johnson |
| 6,827,100 B1 | 12/2004 | Carlson |
| 6,910,673 B2 | 6/2005 | Green et al. |
| 7,020,532 B2 | 3/2006 | Johnson et al. |
| 7,778,734 B2 | 8/2010 | Oswald et al. |
| 7,841,246 B2 | 11/2010 | Swanson et al. |
| 8,224,490 B2 | 7/2012 | Knyazev |
| 8,521,332 B2 | 8/2013 | Tiemann et al. |
| 8,552,857 B2 | 10/2013 | Berezowski et al. |
| 9,046,896 B1 * | 6/2015 | Brunelle ............ G05D 23/1934 |
| 2007/0220907 A1 | 9/2007 | Ehlers |
| 2008/0223947 A1 | 9/2008 | Liu |
| 2010/0045470 A1 | 2/2010 | Araiza et al. |
| 2010/0280665 A1 | 11/2010 | Fildes et al. |
| 2010/0298992 A1 | 11/2010 | Knyazev |
| 2011/0127343 A1 | 6/2011 | Rimmer |
| 2011/0153089 A1 | 6/2011 | Tiemann et al. |
| 2011/0198406 A1 | 8/2011 | Zhadanovsky |
| 2011/0257795 A1 | 10/2011 | Narayanamurthy et al. |
| 2012/0256108 A1 | 10/2012 | Kaestle et al. |

FOREIGN PATENT DOCUMENTS

| | | |
|---|---|---|
| EP | 0676683 B1 | 8/1998 |
| EP | 1163558 B1 | 8/2002 |
| EP | 1959202 A2 | 8/2008 |
| EP | 1729195 B1 | 11/2009 |
| EP | 2144015 A2 | 1/2010 |
| EP | 2154595 A2 | 2/2010 |
| EP | 2157376 A2 | 2/2010 |
| EP | 2442037 A1 | 4/2012 |
| EP | 2626593 A1 | 8/2013 |
| EP | 2435887 B1 | 12/2013 |
| GB | 2462143 A | 2/2010 |
| WO | 2012108761 A2 | 8/2012 |
| WO | 2012116322 A1 | 8/2012 |

* cited by examiner

SYSTEMS AND METHODS FOR CONTROLLING CONDITIONED FLUID SYSTEMS IN A BUILT ENVIRONMENT

BACKGROUND

Technical Field

This disclosure generally relates to systems and methods for controlling conditioned fluid systems in a built environment. In particular, the systems and methods of this disclosure wirelessly control the flow rate of conditioned fluid at thermal distribution devices and at the conditioned fluid source that supplies conditioned fluid to the thermal distribution devices.

Background of Related Art

Traditionally, apartments or commercial buildings, especially small buildings up to three stories, used a single thermostat with a temperature setpoint to activate the boiler to burn fuel and thereby produce steam for heating the building. All subsequent steam heat strategies are built from this principle.

One strategy is to place a number of sensors, e.g., six temperature sensors, on the top floor of a building in residential units to collect temperature data. This data is then averaged and the boiler runtime is adjusted to maintain approximately 80% of the building within an acceptable temperature range. This means that about 20% of the remaining units are either too hot or too cold.

Another strategy is to apply another layer of control at the radiator. This comes in the form of thermostatic radiator valves, such as those available from Danfoss. These valves are mechanical valves that adjust air venting from the radiator based on the change in buoyancy. There is an alcohol-filled float that rises with increases in temperature.

In an effort to reduce energy costs, building owners often make shell improvements and improvements to the heating and cooling systems. However, these improvements do not address the distribution of conditioned fluid.

SUMMARY

The systems and methods of this disclosure involve controlling the distribution of conditioned fluid that heats or cools buildings to ensure the balanced heating or cooling of rooms within buildings. In one aspect, this disclosure features a steam heating control system including a server, electro-mechanical air vents, steam sensors, room temperature sensors, first controllers, and a second controller. The electro-mechanical air vents are adapted to be placed in fluid communication with respective steam radiators disposed in rooms of a building. The steam sensors are adapted to be disposed at different positions on each of the steam radiators. The steam sensors are configured to sense the progression of steam through each of the steam radiators.

The room temperature sensors are adapted to be disposed in each of the rooms of the building. The room temperature sensors measure room temperature in each of the rooms and transmit the measured room temperatures to the server. The first controllers are each electrically coupled to a respective one of the electro-mechanical air vents and the steam sensors. The first controllers transmit the sensed progression of steam to the server and control the electro-mechanical air vents based on a first control signal received from the server. The second controller is electrically coupled to a steam source. The second controller modulates the flow rate of steam output from the steam source based on a second control signal received from the server.

The server generates the first control signals based on the measured room temperatures and the sensed progression of steam through the plurality of radiators, determines the steam requirements of the plurality of radiators, and generates the second control signal based on the determined steam requirements of the plurality of radiators.

In another aspect, this disclosure features a conditioned fluid distribution monitoring and control system. The conditioned fluid distribution monitoring and control system includes a fluid flow control device, sensors, a room temperature sensor, and a controller. The fluid flow control device is adapted to be placed in fluid communication with a thermal distribution device. The sensors are adapted to be disposed at different positions on the thermal distribution device to sense the amount of conditioned fluid in the thermal distribution device. The room temperature sensor measures room temperature and wirelessly transmits the measured room temperature to a server.

The controller is connected to the sensors and the fluid flow control device to control the flow rate of conditioned fluid to the thermal distribution device. The controller includes a communications interface that transmits to a server the sensed amount of conditioned fluid in the thermal distribution device. The communications interface also receives from the server a first control signal to control the fluid flow control device to modulate the flow of conditioned fluid into the thermal distribution device. The communications interface further receives a second control signal to modulate the flow of conditioned fluid from a conditioned fluid source based on the requirements of the thermal distribution device and at least another thermal distribution device.

BRIEF DESCRIPTION OF THE DRAWINGS

Various embodiments of this disclosure are described with reference to the accompanying drawings wherein.

DETAILED DESCRIPTION

Figure 1:
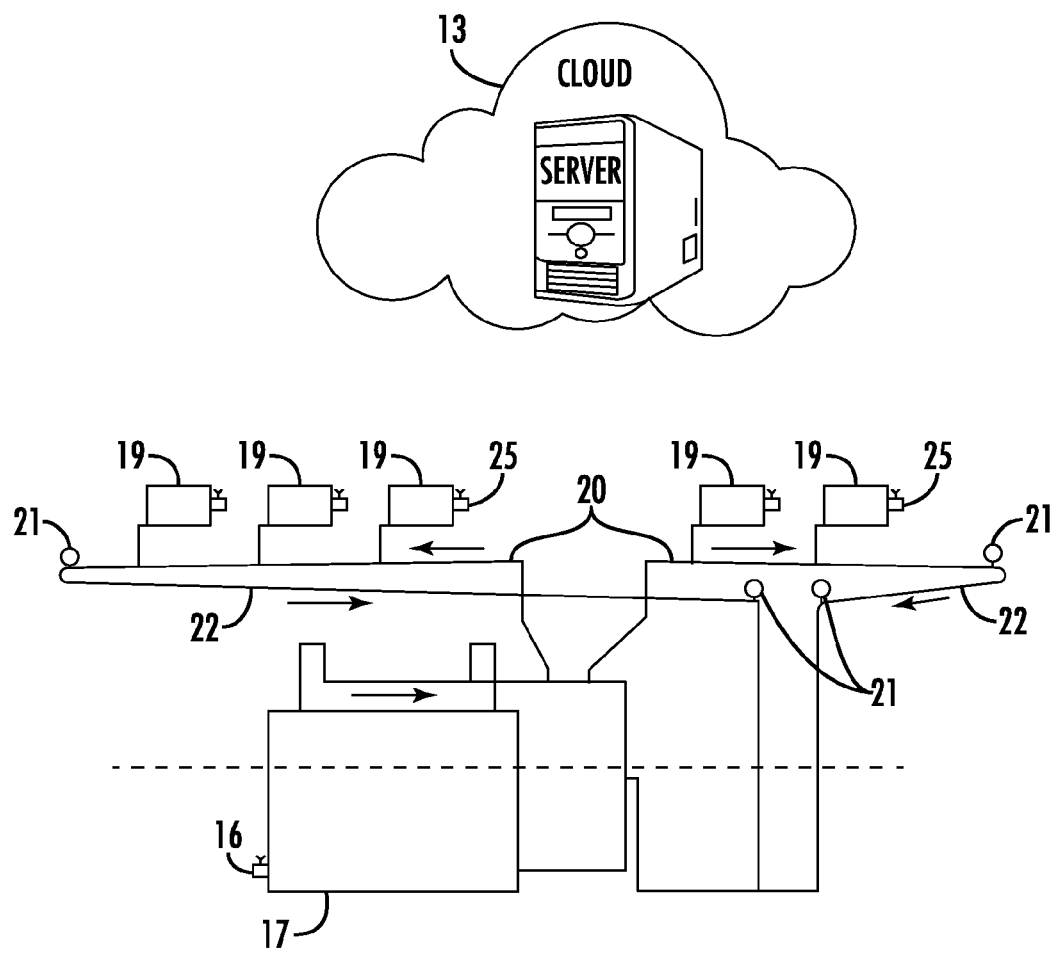
FIG. 1 is a diagram of a one-pipe steam heating system according to embodiments of this disclosure.

The systems and methods of this disclosure dynamically redistribute heating and cooling to those rooms that require conditioned air, e.g., those rooms that are occupied. To accomplish this, the systems and methods of this disclosure control the flow rate of conditioned fluid (e.g., air, steam, or water) through a thermal distribution device (e.g., a steam radiator, a low mass radiator, a hydronic baseboard radiator, or a diffuser of a forced-air heating and cooling system) to selectively heat or cool individual rooms of a commercial or residential structure or building to different temperature setpoints.

In the case of steam heating, a server transmits a first control signal to a radiator controller to control an electro-mechanical air vent to cause a desired amount of steam to flow into a steam radiator in order to achieve a desired temperature setpoint. The server also transmits a second control signal to a steam source to control or modulate the flow rate of the steam output from the steam source based on the amount of steam demanded or call for by the steam radiators in a building. The systems and methods of this disclosure not only provide increased comfort, but also provide energy savings in larger buildings as a result of controlling the volume of fluid conduits, e.g., piping, and modulating the fluid flow control devices.

The control systems of this disclosure includes a thermal distribution device controller, a fluid flow control device for controlling the flow of conditioned fluid to a thermal distribution device, a room temperature sensor, and multiple conditioned fluid sensors disposed on the thermal distribution device. The thermal distribution device controller and the room temperature sensor provide sensor data and room temperature data via a wireless connection with a cloud server, which generates control signals based on the sensor data, the room temperature data, and room temperature setpoints. The cloud server transmits those control signals to the thermal distribution device controller to regulate the temperature of individual rooms in a residential or commercial structure or building and to modulate the flow rate of steam output from the steam source.

The control systems may be designed to operate on a variety of systems including a steam system, a hydronic system, and a forced-air system. The control systems may include a room temperature sensor. The control systems may include other sensors for determining whether a room is occupied or how many persons are occupying a room. The other sensors may include a humidity sensor, a CO2 sensor, and a light sensor (to determine whether someone turns on a light to occupy a room). One or more of these other sensors may be included in the room temperature sensor.

In the case of a steam system or a hydronic system, the room temperature sensor may include a wireless communication interface that transmits room temperature measurements and optionally other measurements, such as CO2 measurements and light measurements, to a cloud server. The cloud server processes measurements from the room temperature sensor and the sensors disposed on the thermal distribution device, e.g., a steam radiator, to obtain control signals for controlling the fluid flow control devices, e.g., an electro-mechanical air vent on a steam radiator, to achieve a desired temperature setpoint in a room of a commercial or residential structure. The cloud server transmits the control signals to the thermal distribution device controller, which controls the fluid flow control device to modulate the flow of fluid to or from the thermal distribution device. The fluid flow control device may include any combination of valves, actuators, and motors.

In the case of steam heating, such as a two-pipe system, the fluid flow control device may be an electro-mechanical air vent including valve and an actuator, such as an electric motor or a solenoid, for actuating the valve, which may be a latching solenoid valve or a ball valve. The controller may drive a motor or solenoid to actuate a valve to open and close to provide a desired amount of steam to a steam radiator to reach a desired temperature setpoint.

In the case of a hydronic system, the fluid flow control device may include a motorized baseboard damper, which may be electronically controlled or modulated to vary the flow of air through the baseboard radiator based on room temperature measurements. In boiler room, there is a relay measuring exhaust temperature and air to fuel ratio and vibration.

In the case of an HVAC cooling system, the fluid flow control device may include relays and valves. The controller may turn on and turn off a relay and open and close valves in the HVAC cooling system to selectively provide a desired amount of conditioned fluid to multiple cooling distribution devices.

In the case of a forced air system, the fluid flow control device may include motorized dampers within the duct system to modulate the flow of air through branches of the duct system. The thermal distribution device may include diffusers. Temperature sensors, pressure sensors, flow rate sensors, or any combination of these sensors may be placed in or on ducts at various points in the duct system, e.g., along the length of duct branches. Based on the duct temperature, pressure, flow rate measurements, or any combination of these measurements, the controller may open, partially open, or close the motorized dampers to provide a desired amount of conditioned air to a diffuser to reach a desired room temperature setpoint.

FIG. 1 is a diagram of an example of a one-pipe parallel steam heating system with multiple steam mains 20 according to embodiments of this disclosure. The boiler 17 provides steam to multiple radiators 19 through multiple steam mains 20, each having main vents 21.

The steam heating system 10 also includes dry returns 22 connected between the steam mains 20 and the boiler 17. A distribution device controller assembly 25 is coupled to each of the radiators 19. The distribution device controller assembly 25 includes an electro-mechanical air vent which is configured to be placed in fluid communication with the radiators 19 and a controller, which may include an H-bridge, for controlling the electro-mechanical air vent 15 to open, close, or provide any degree of opening. A boiler controller 16 is also coupled to the boiler 17 to modulate the flow rate of steam generated by the boiler 17.

In embodiments, the distribution device controller assemblies 25 and the boiler controller 16 include wireless communications interfaces allowing for communications with a cloud server 13. The distribution device controller assemblies 25 acquire information regarding the progression of steam through respective radiators 19, e.g., by reading temperature measurements of temperature sensors disposed on the radiators 19 along a predetermined steam path, and transmit this steam information to the cloud server 13.

The cloud server 13 generates first control signals based on temperature set points for each of the rooms (which may be set using an application for setting room temperature set points in individual rooms) and the steam information. The cloud server 13 then transmits these first control signals to distribution device controller assemblies 25, which control the flow rate of steam through the radiators 19 to reach the room temperature set points. The cloud server 13 also determines the demand for steam by the radiators 19 to reach the room temperature set points and transmits a second control signal or a boiler control signal to modulate the flow rate of steam generated by the boiler 17 to meet the demand for steam. For example, if the cloud server 13 determines that the number of rooms calling for heat decreases below a threshold, the cloud server 13 generates a second control signal or a boiler control signal that controls the boiler 17 to decrease the flow rate of the steam provided by the boiler 17.

In embodiments, the second control signal may control the burner (not shown) of the boiler 17 to increase or decrease the production of steam based on the demand for steam by the radiators 19. Alternatively or additionally, the second control signal may modulate the turning on or off of the boiler 17. Alternatively or additionally, controllers (not shown) associated with motorized main steam riser vents 21 or motorized valves in the steam mains 20 may open, close, or partially open the motorized main steam riser vents 21 or motorized valves in the steam mains 20 based on control signals received by the controllers from the cloud server 13.

Figure 2:
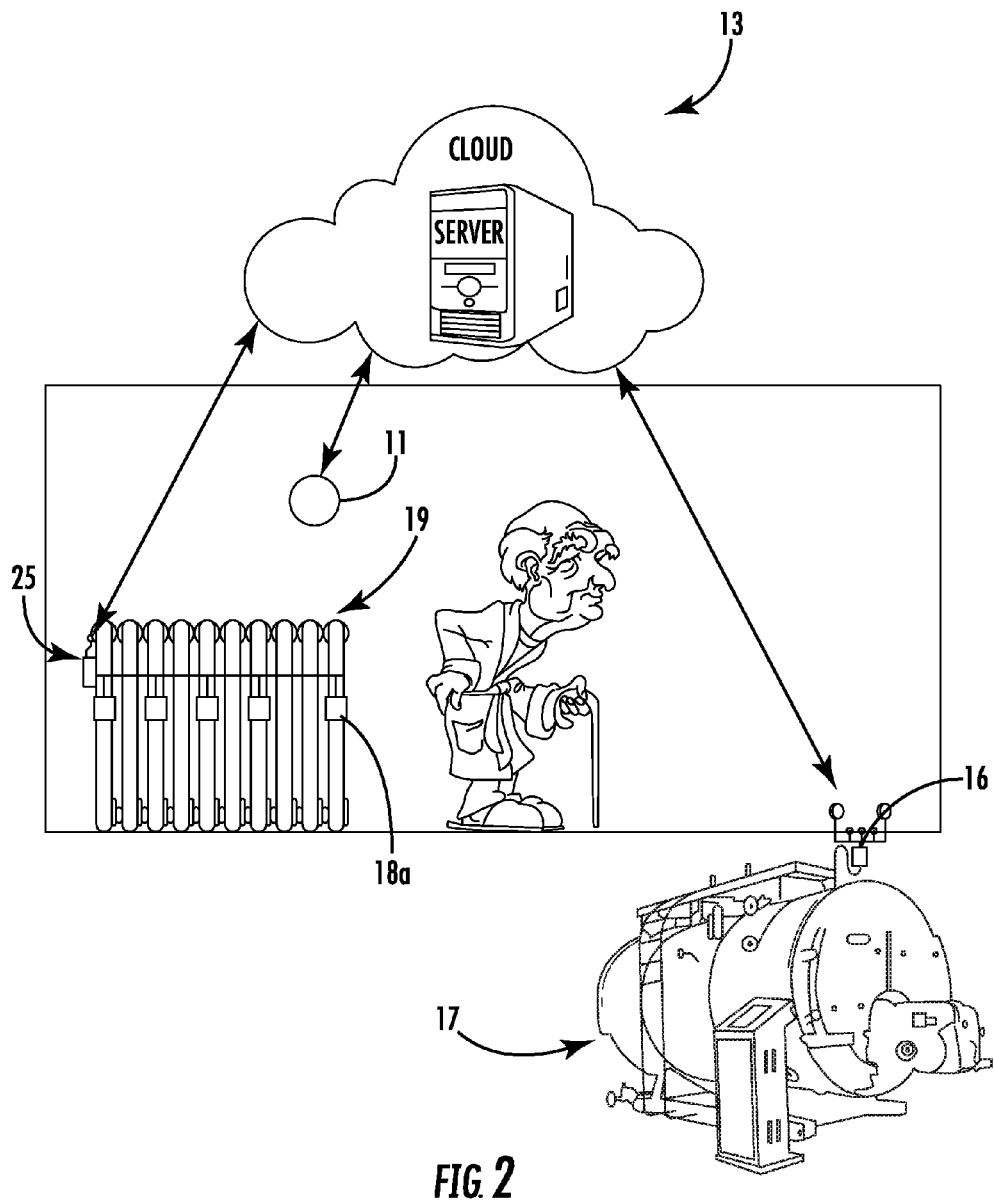
FIG. 2 is a diagram of a steam heating control system according to embodiments of this disclosure.

FIG. 2 is a diagram of a steam heating control system 10. The thermal distribution device controller 14, the room temperature sensor 11, and the boiler controller 16 are equipped with wireless communication devices 24 to enable communications with a cloud server 13. The cloud server 13 collects measurement data, processes the measurement data, generates control signals based on the processed measurement data, and sends control signals to the thermal distribution device controller 14 and the boiler controller 16.

Figure 3A:
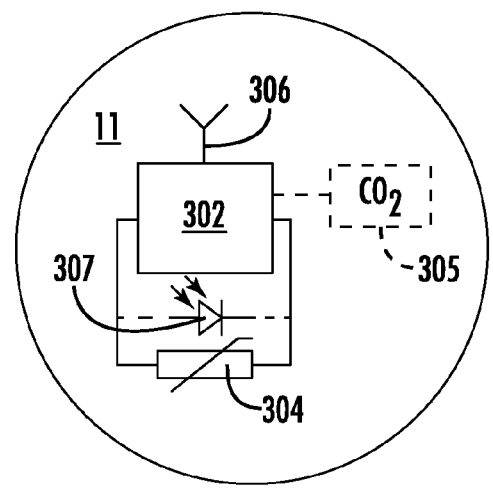
FIG. 3A is a schematic diagram of a room temperature sensor according to an embodiment of this disclosure.

FIG. 3A is a schematic diagram of an example room temperature sensor 11. The room temperature sensor 11 includes processing and communications circuitry 302, a thermistor 304, and a wireless antenna 306. The processing and communications circuitry 302 obtains room temperature measurements from the thermistor 304 and carbon dioxide measurements from the carbon dioxide sensor 305, and transmits these measurements to the cloud server 13 via the wireless antenna 306. The processing and communications circuitry 302 may take room temperature measurements at a predetermined sample rate, e.g., every 1 minute or 15 minutes. The processing and communications circuitry 302 may stream this time-series measurement data to the cloud server 13.

The room temperature sensor 11 may be powered by batteries (not shown), such as rechargeable batteries, or may be powered by a power supply (not shown) configured to receive power from a wall outlet or other AC power source such as a 120 VAC power source. The cloud server 13 uses the temperature measurements to generate a radiator control signal to open or close an electro-mechanical air vent to change the amount of heat supplied by the radiator 19 to a room so that the temperature measured by the room temperature sensor 11 reaches a predetermined or preset room temperature setpoint.

As shown in FIG. 3A, the room temperature sensor 11 may optionally include a carbon dioxide sensor 305, a photodiode 307, or both to sense the presence or approximate number of persons in the room. The room temperature sensor 11 may transmit carbon dioxide sensor readings and sensed light readings to the cloud server 13 so that the cloud server 13 can control the heat output from the radiators 19 based on the carbon dioxide sensor readings, the sensed light readings, or both. For example, the carbon dioxide readings may indicate a large number of persons in a room, in which case the cloud server 13 would send a control signal to a thermal distribution device controller 14 to close the electro-mechanical air vent so that the heat output from the radiator 19 is reduced.

Figure 3B:
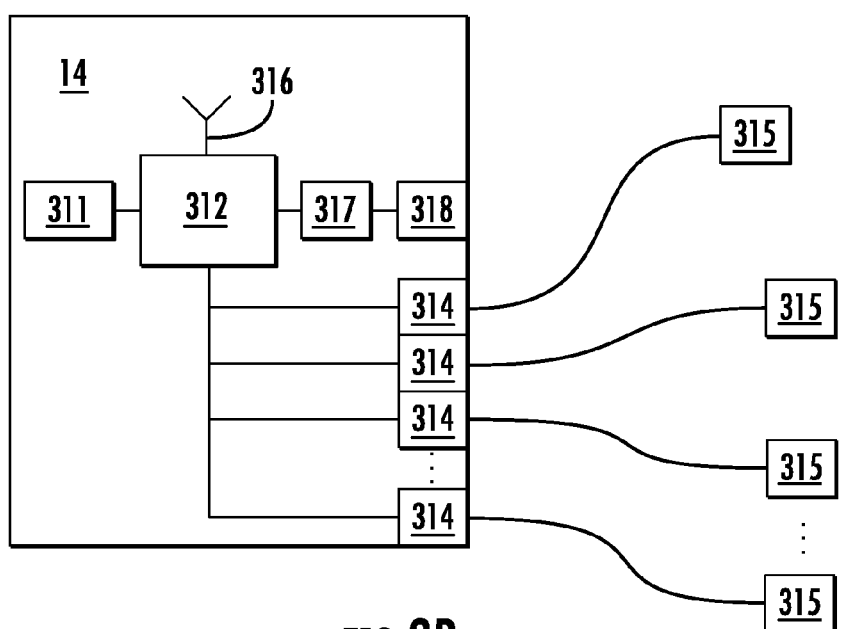
FIG. 3B is a schematic diagram of a thermal distribution device controller according to embodiments of this disclosure.

FIG. 3B is a schematic diagram of a thermal distribution device controller 14 according to embodiments of this disclosure. The thermal distribution device controller 14 includes a memory 311, a processor 312 (e.g., a microprocessor having a central processing unit (CPU)), sensor input ports 314, sensors 315, a drive signal output port 317, and a wireless antenna 316. The drive signal output port 317 may connect to the electrical input of the electro-mechanical air vent.

The processor 312, which includes a wireless communications interface, acquires sensor data from the sensors 315 via the sensor inputs ports 314 and transmits the sensor data to the cloud server 13. The wireless communications interface of the processor 312 also receives control signals from the cloud server 13, which the processor 312 uses to control the electro-mechanical air vent to open or close. The thermal distribution device controller 14 may include any number of sensor input ports 314 depending on the desired measurement resolution of the progression of steam through the radiator 19. In some embodiments, the thermal distribution device controller 14 includes a number of sensor input ports 314 and corresponding sensors 315 that is at least equal to the number of radiator sections so that one sensor 315 may be disposed on each of the radiator sections.

In some embodiments, the sensors 315 may be Inter-Integrated Circuit (I2C) sensors in which each sensor has a unique ID. In those embodiments, only one pin of the processor 312 is needed to obtain data from the sensors 315. The unique ID of each of the sensors 315 may be associated with the position of the sensor on the radiator 19 so that the progression of the steam through the radiator 19 may be determined.

In some embodiments, the processor 312 may go into a sleep or deep sleep mode after a predetermined period in order to extend the battery life of the thermal distribution device controller 14. The processor 312 may then wake up from the sleep mode when the sensor closest to the steam input of the radiator 19 senses a temperature above a threshold.

Figure 4A:
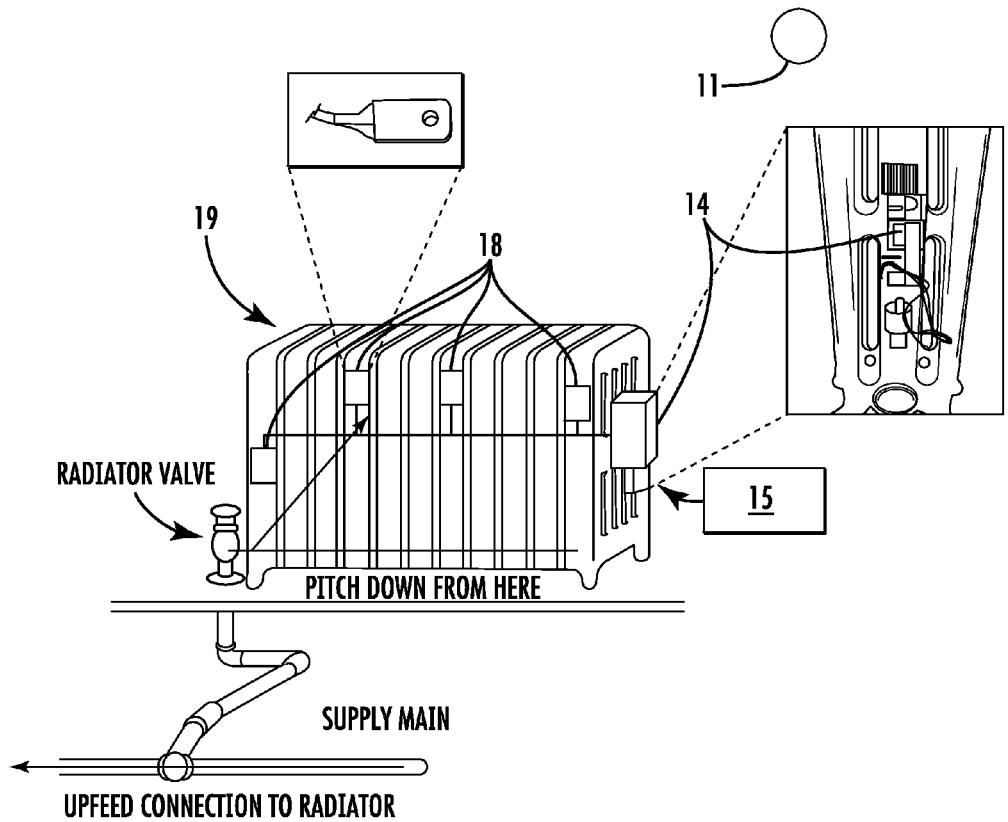
FIG. 4A is an illustration of a radiator incorporating a thermal distribution device controller according to an embodiment of this disclosure.

FIG. 4A is an illustration of a radiator 19 incorporating a thermal distribution device controller 14. A series of sensors 18, e.g., thermocouples, are installed at multiple points along the back face of the radiator 19 to sense the progression of steam through the radiator 19. The sensors 18 may be replaced with any type of sensor that is suitable for sensing the progression of steam through the radiator 19, such as optical temperature sensors, strain gauges, or the like. The sensors 18 are electrically connected to an input port of the thermal distribution device controller 14, e.g., a radiator output BTU modulation controller, which collects measurement data from the sensors 18 and transmits the measurement data to the cloud server 13.

Figure 4B:
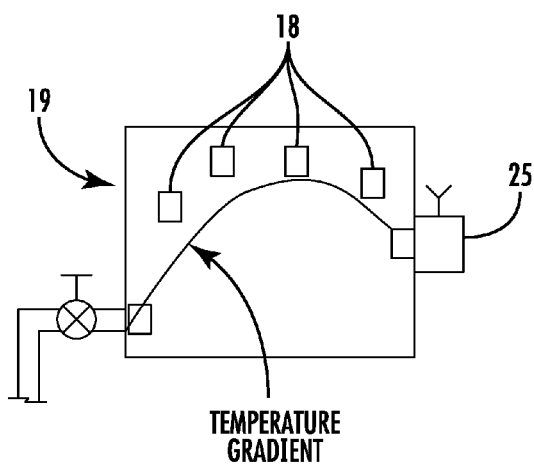
FIG. 4B is an illustration of a radiator on which sensors are positioned according to the temperature gradient according to embodiments of this disclosure.

FIG. 4B is an illustration of a radiator 19 on which sensors 18 are positioned according to the temperature gradient of the steam as it progresses through the radiator 19. The temperature gradient may be determined by using any number of techniques known to those skilled in the art.

The sensors 18 may be strategically positioned on the radiator 19 according to the path of the steam as it progresses through the radiator 19. The path of the steam is dependent on pressure and temperature differences within the radiator 19, the thermal conductivity of the radiator 19, and the design or type of the radiator 19, e.g., a columnar type or a tubular type. The path of the steam may be determined by using thermal imaging models and heat transfer calculations. In newer types of steam radiators, the path of the steam may resemble the shape of an inverse parabola or bell curve starting from the bottom left of the radiator. The left-most sensor may be disposed about one third of the way up from the bottom of the radiator near the electro-mechanical air vent. In embodiments, if the left-most sensor senses a temperature greater than a predetermined temperature, e.g., 130° F., the thermal distribution device controller 14 may wake up from a sleep state and start taking temperature readings from all steam sensors to detect the progression of steam through the radiator 19.

Figure 5:
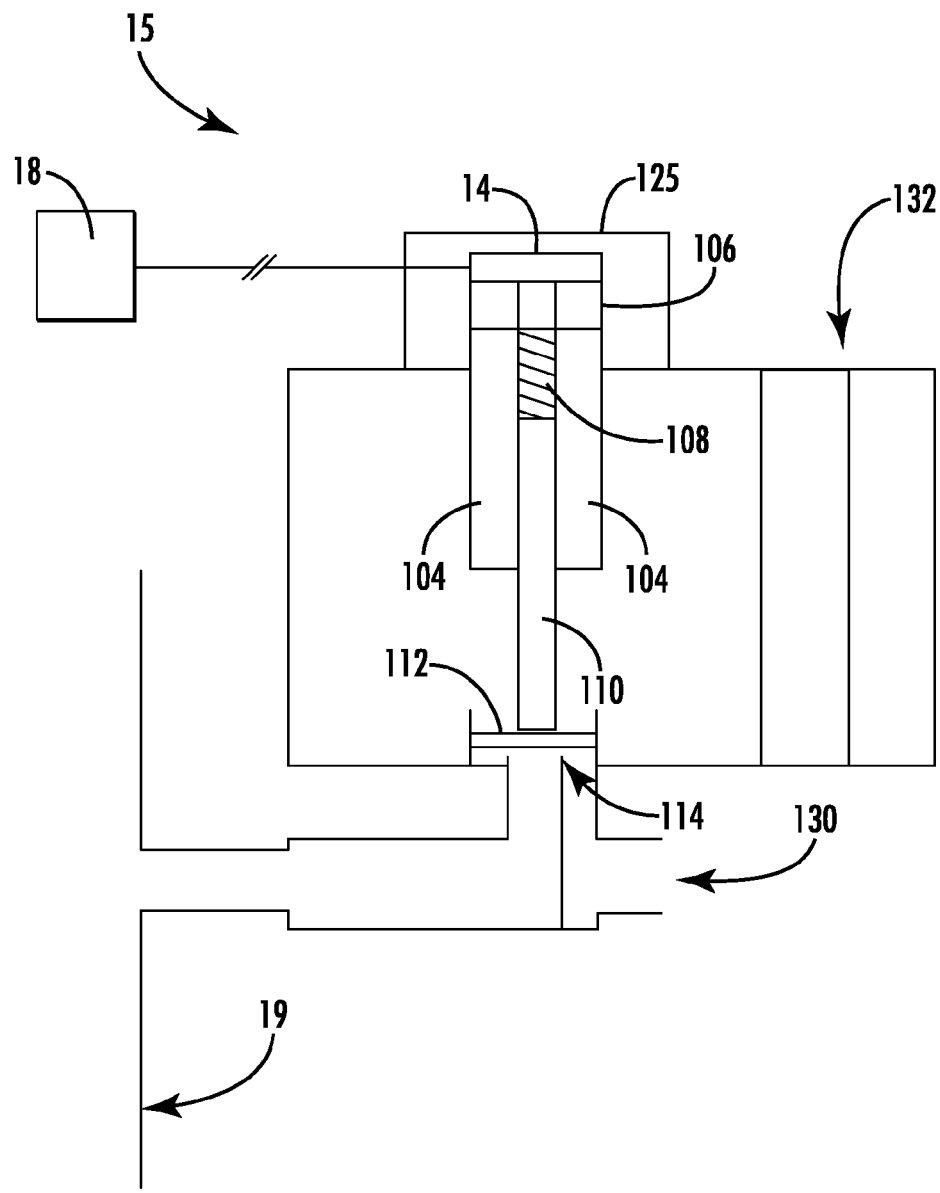
FIG. 5 is an illustration of an electro-mechanical steam radiator vent which incorporates a controller according to embodiments of this disclosure.

FIG. 5 is an illustration of an electro-mechanical air vent 15 which incorporates a thermal distribution device controller 14 incorporated into a cap 125 of the electro-mechanical air vent 15 and a pulse-latching solenoid valve. The thermal distribution device controller 14 controls a pulse-latching solenoid valve to open and close the electro-mechanical air vent 15. The pulse-latching solenoid valve includes a coil 104, a permanent magnet 106, a spring 108, an armature or plunger 110, and a diaphragm 112. FIG. 5 shows the pulse-latching solenoid valve in the open position.

In operation, when a pulse of current flows in one direction in the coil 104, the plunger 110 is pulled towards the permanent magnet 106 to compress the spring 108, and is held in the open position by the permanent magnet 106 as shown in FIG. 5. When a pulse of current flows in the opposite direction in the coil 104, the plunger 110 is pulled away from the permanent magnet 106 and the spring 108 causes the plunger 110 to push the diaphragm 112 against the seat 114 of the valve so that it maintains the closed position to prevent the flow of fluid through the valve body 130. Because the pulse-latching solenoid valve requires very little power to operate, it may be powered by batteries 132, which may be charged from power generated from the heat output of the radiator 19. For example, the power may be generated by a thermoelectric generator thermally coupled to the radiator 19. The thermoelectric generator may be any thermoelectric generator known in the art. The thermal distribution device controller 14 may also be powered by the batteries 132.

Figure 6:
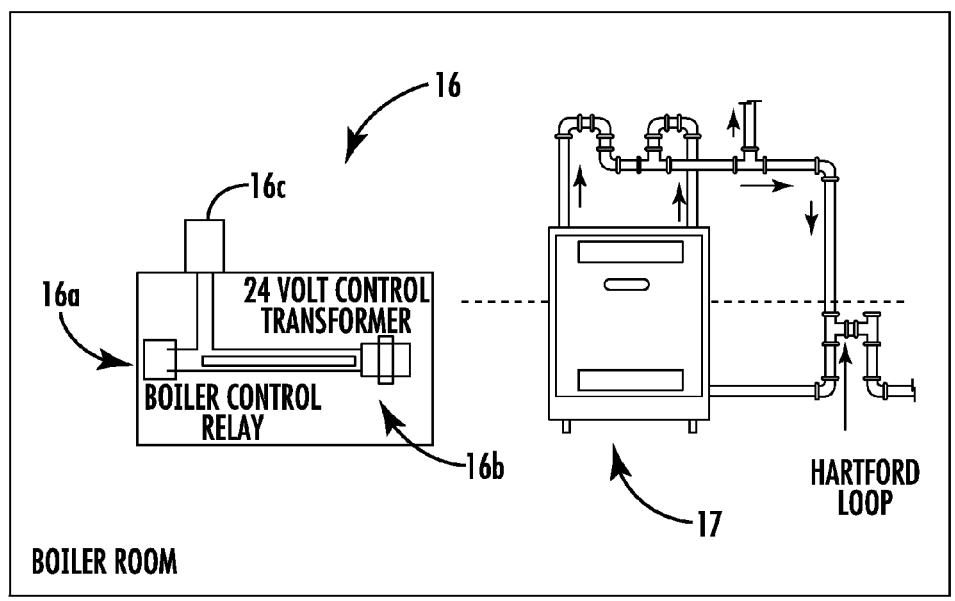
FIG. 6 is a diagram of a boiler control system according to an embodiments of this disclosure.

FIG. 6 is a diagram of a boiler controller 16. The boiler controller 16 includes a boiler control relay 16a, a control transformer 16b, and a boiler controller interface 16c.

The steam heat modulation control system, generally referred to by reference numeral 10, may operate according to the following sequence of operations, as illustrated in FIGS. 2 and 6. When the room temperature sensor 11 reaches a set point to call for heat, a signal is sent from the thermal distribution device controller 14 to the cloud server 13, which processes the request for heat. The cloud server 13 sends a control signal to radiator output BTU modulation controller 14 (see FIG. 3A) to open the valve of the electro-mechanical air vent 15 and to start collecting radiator thermal output data. In some embodiments, the valve may be normally closed until the call for heat.

Next, the cloud server 13 transmits a message or control signal to the boiler controller 16 to control the boiler 17 to produce steam. The sensors 18, e.g., thermocouples, disposed on the radiator 19 provide measurements to the thermal distribution device controller 14, which determines the fill point of steam in the steam radiator or the amount of steam provided to the steam radiator based on the sensor measurements. The controller 14 sends the steam location information to the cloud server 13. This is compared to the degree rise required to reach a requested set point and initial room parameters, such as volume, wall assembly R values, and zip code information for heating degree day look up. Based on the room BTU requirements, the electro-mechanical air vent 15 closes when adequate radiator output is reached based on the BTU output of the radiator 19.

A signal from the controller 14 is sent to the cloud server 13 indicating that the local radiator 19 in a particular room at a particular position is satisfied. This will continue until all radiators 19 have been satisfied.

When the cloud server 13 receives signals from the controllers 14 associated with respective radiators 19 that room temperature setpoints have been reached, the cloud server 13 sends a control signal to the boiler controller 16 to stop the boiler 17 from producing steam.

Figure 7:
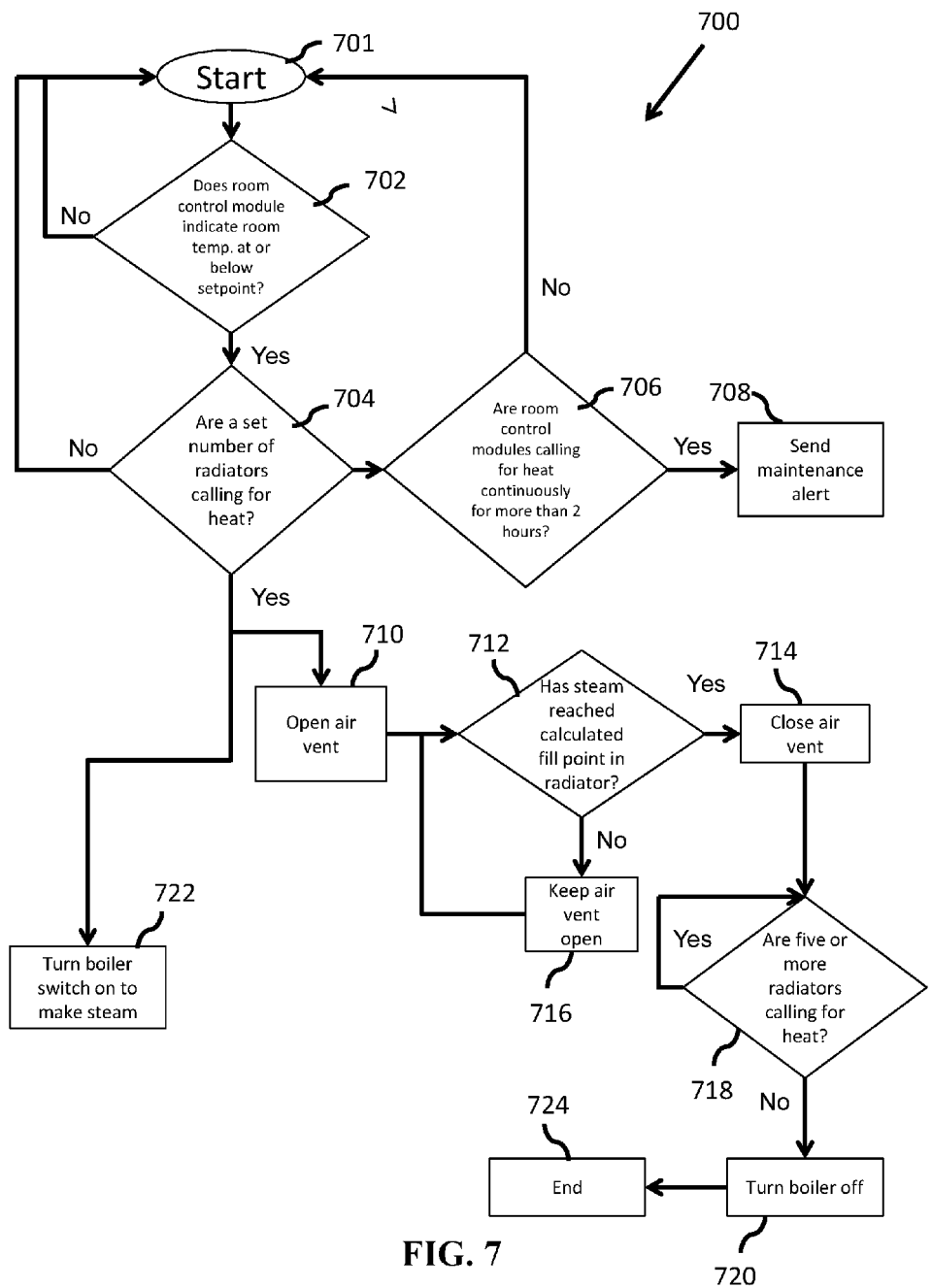
FIG. 7 is a flow diagram illustrating a method of controlling the temperature of the radiator according to an embodiment of this disclosure.

FIG. 7 is a flow diagram illustrating a method 700 of controlling the temperature of the radiator (e.g., radiator 19 as shown in FIG. 1). After starting in step 701, it is determined whether the temperature of the room is at or below a temperature setpoint in step 702. If the temperature of the room is not at or below a setpoint, no control is performed. If the temperature of the room is at or below the temperature setpoint, it is determined whether there are more than a predetermined number of radiators calling for heat in step 704. The predetermined number of radiators may be any number of radiators. In one embodiment, the predetermined number of radiators is five. If less than five radiators are calling for heat, the cloud server (e.g., cloud server 13 as shown in FIG. 2) waits for more room control modules (e.g., room control module 11 as shown in FIG. 2) to call for heat.

If any of the room control modules call for heat for more than a predetermined period in step 706, the cloud server may send a maintenance alert in step 708. The predetermined period of time may be any time period. In one embodiment, the predetermined time period is two hours. If five or more room control modules are calling for heat, the cloud server sends a control signal to the thermal distribution device controllers (e.g., the thermal distribution device controller 14 as shown in FIG. 2) to open their respective air vents (e.g., air vent 15 as shown in FIG. 5) in step 710 and sends a control signal to the boiler controller (e.g., boiler controller 16 as shown in FIG. 2) to operate the boiler (e.g., boiler 17 as shown in FIG. 1) so that it produces steam in step 722.

Next, in step 712 the thermal distribution device controllers determine whether the steam has reached a calculated fill point in the radiator. If not, the air vent is maintained open in step 716. Otherwise, the thermal distribution device controller closes the air vent in step 714. Then, in step 718 the cloud server determines whether five or more radiators are calling for heat. If not, the cloud server sends a control signal to the boiler controller to stop the boiler from producing steam in step 720. Once the boiler has been turned off, the process ends in step 724.

Figure 8:
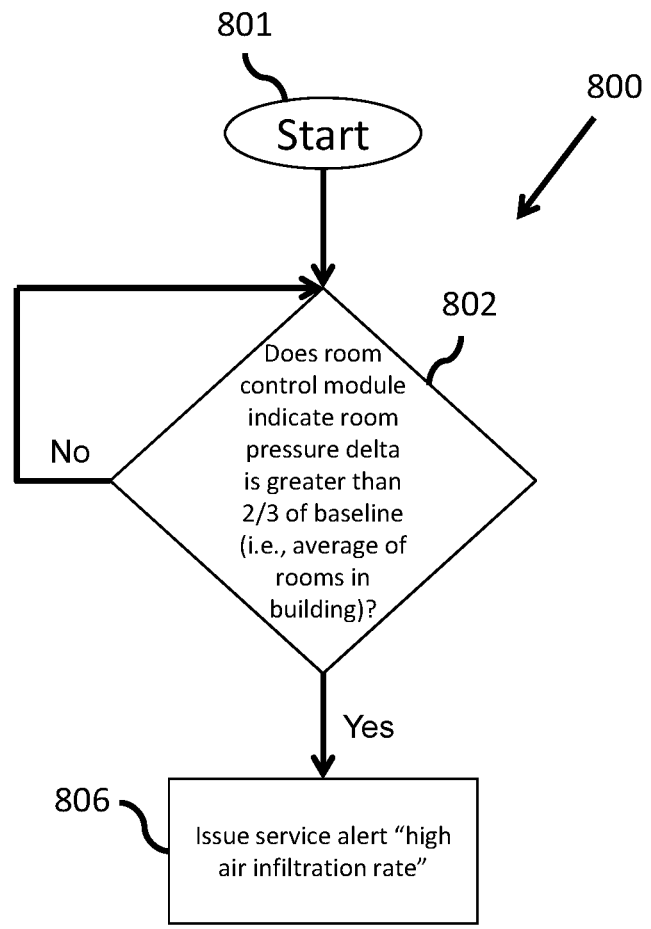
FIG. 8 is a flow diagram illustrating a method of monitoring pressure according to an embodiment of this disclosure.

FIG. 8 is a flow diagram illustrating a method 800 of monitoring pressure. After starting in step 801, the thermal distribution device controller (e.g., the thermal distribution device controller 14 as shown in FIG. 2) determines whether the measured change in pressure is above or below a baseline, defined as being the average of all rooms in the system, in step 802. If the measured change in pressure is less than two thirds of the baseline, the thermal distribution device controller 14 does nothing. If the measured change in pressure is greater than two thirds of the baseline, the thermal distribution device controller 14 sends a service alert to the cloud server (e.g., cloud server 13 shown in FIG. 2) indicating that there is a high air infiltration rate in step 806.

Figure 9:
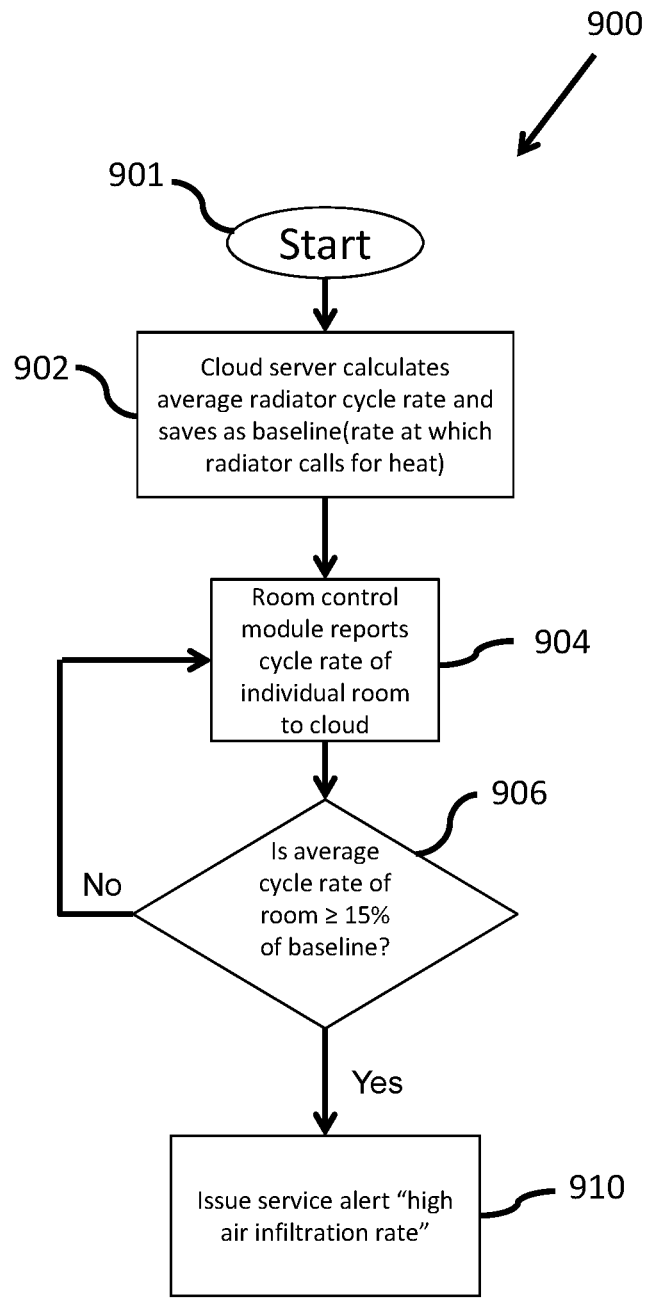
FIG. 9 is a flow diagram illustrating a method of monitoring system cycling frequency according to an embodiment of this disclosure.

FIG. 9 is a flow diagram illustrating a method 900 of monitoring system cycling frequency. After starting in step 901, the cloud server (e.g., cloud server 13 as shown in FIG. 2) calculates the average radiator cycle rate and saves the value as a baseline in step 902. Next, in step 904 the thermal distribution device controller (e.g., the thermal distribution device controller 14 shown in FIG. 2) reports the cycle rate of an individual room to the cloud server. In step 906, the cloud server determines if the cycle rate is 15% greater than the average cycle rate baseline. If so, the room control module (e.g., room control module 11 shown in FIG. 2) sends a service alert to the cloud server indicating that there is a high air infiltration rate in step 910. Otherwise, the room control module does nothing.

Figure 10:
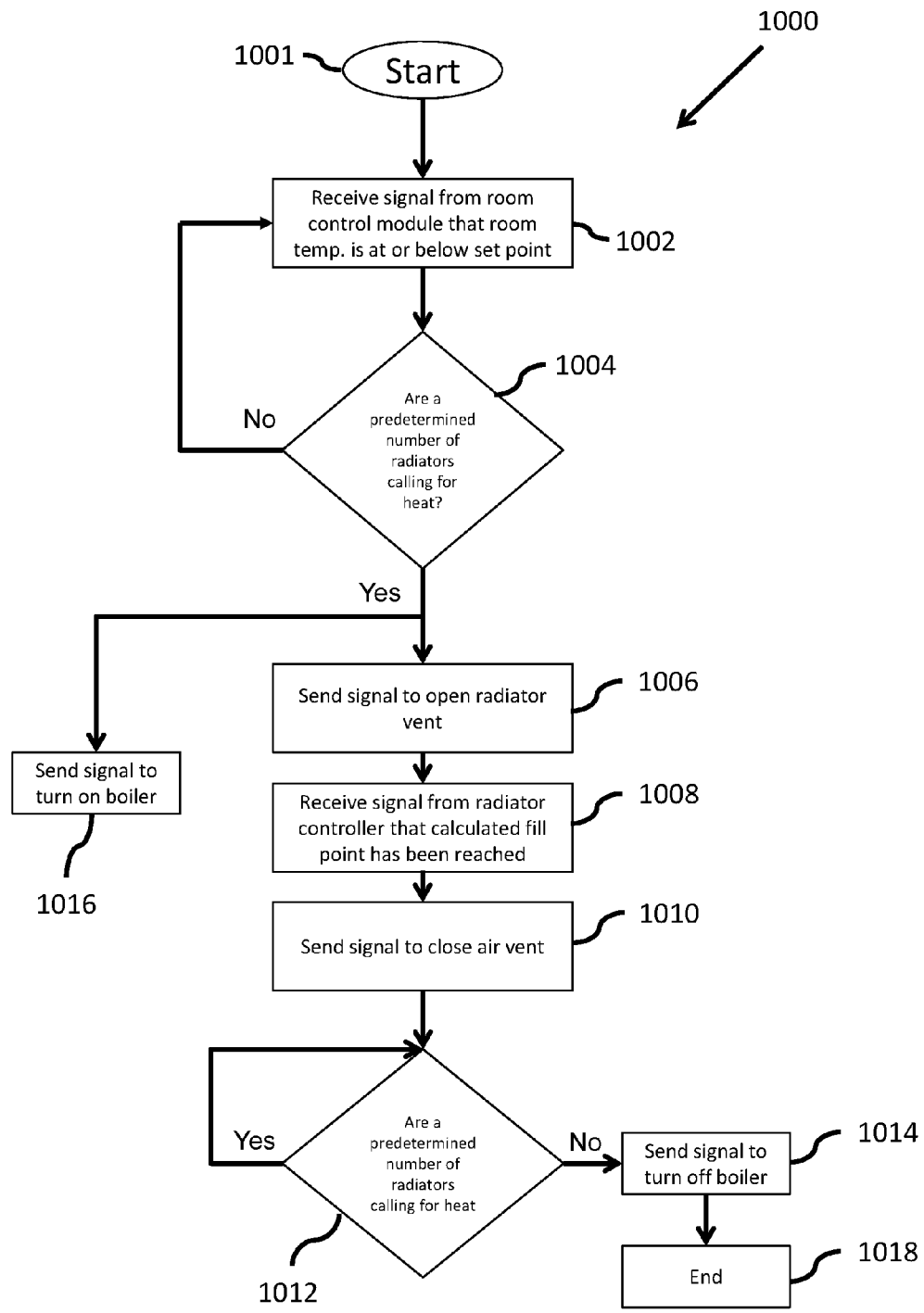
FIG. 10 is a flow diagram illustrating a method of controlling the temperature of a plurality of rooms using a cloud server.

FIG. 10 is a flow diagram illustrating a method 1000 of controlling the temperature of a plurality of rooms using a cloud server (e.g., cloud server 13 shown in FIG. 2). After starting in step 1001, the cloud server receives a signal from a room control module (e.g., room control module 11 shown in FIG. 2) that the room temperature is at or below the set temperature in step 1002. In step 1004, the cloud server determines whether five or more room control modules are calling for heat. If so, the cloud server sends a signal to the thermal distribution device controller (e.g., the thermal distribution device controller 14 shown in FIG. 2) to open the electro-mechanical air vent (e.g., electro-mechanical air vent 15 shown in FIG. 5) of the radiator (e.g., radiator 19 shown in FIG. 1) in step 1006, and sends a signal to the boiler controller (e.g., boiler controller 16 shown in FIG. 2) to turn on the boiler (e.g., boiler 17 shown in FIG. 1) in step 1016. If not, the method returns to step 1002.

If it is determined that more than five room control modules are calling for heat and the radiator vent has been opened, the cloud server receives a signal from the distribution device controller that the calculated fill point has been reached in step 1008. If the calculated fill point has been reached, the cloud server sends a signal to the distribution device controller to close the air vent in step 1010. If the air vent has been closed, the cloud server determines if five or more room control modules are calling for heat in step 1012. If so, the cloud server does nothing in step 1018. If not, the cloud server sends a signal to the boiler controller to turn off the boiler in step 1014.

Figure 11:
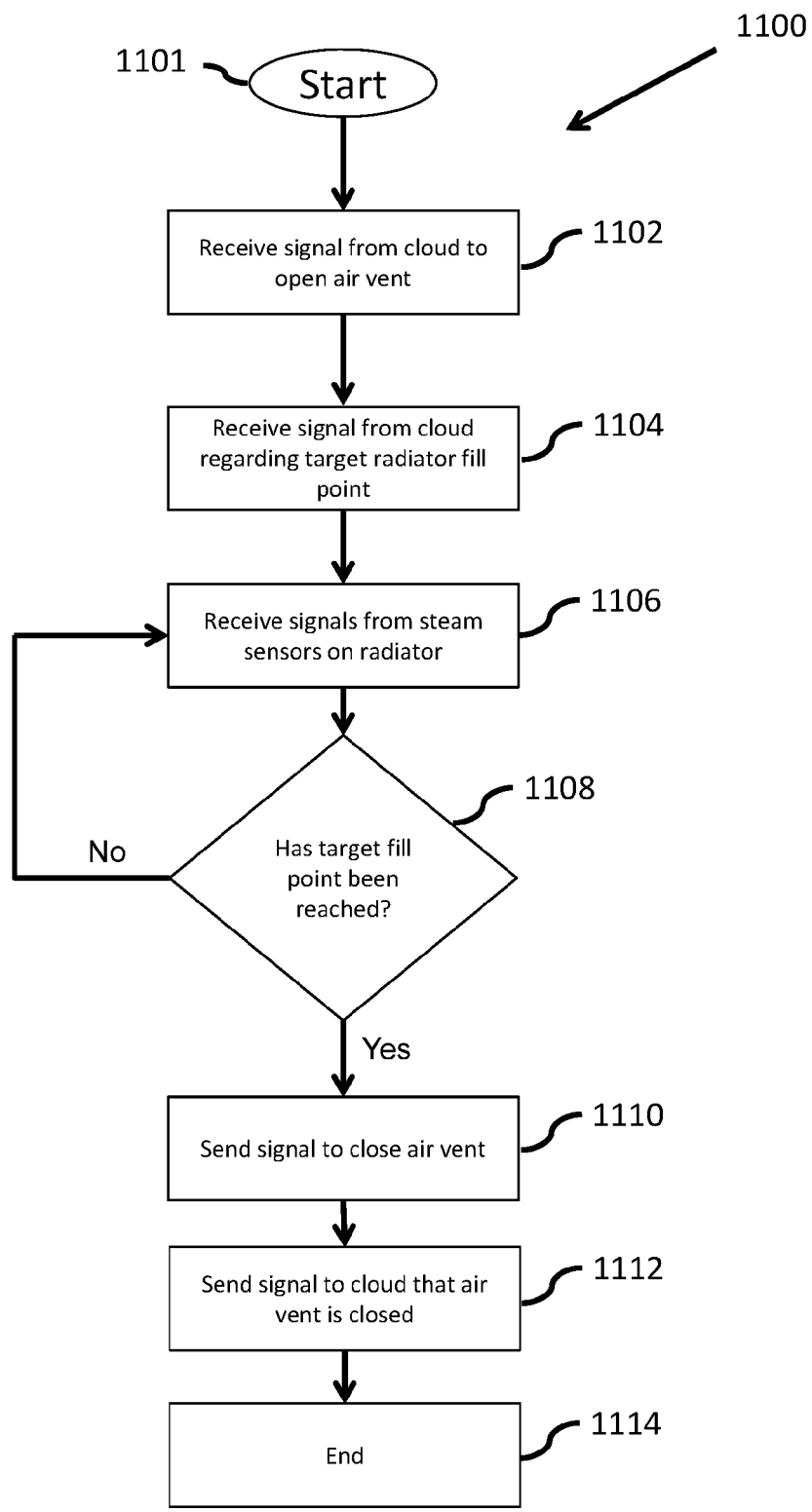
FIG. 11 is a flow diagram illustrating a method of controlling an electro-mechanical air vent of a radiator.

FIG. 11 is a flow diagram illustrating a method 1100 of controlling the electro-mechanical air vent (e.g., the electro-mechanical air vent 15 shown in FIG. 5) of a thermal distribution device (e.g., radiator 19 shown in FIG. 1). After starting in step 1101, the thermal distribution device controller (e.g., the thermal distribution device controller 14 shown in FIG. 2) receives a signal from the cloud server (e.g., cloud server 13 shown in FIG. 2) to open the air vent in step 1102. In step 1104, the distribution device controller receives a signal from the cloud server regarding the target fill point of the radiator. The target fill point of the radiator may be determined using a temperature gradient of the radiator. In step 1106, the distribution device controller receives signals from the plurality of temperature sensors (e.g., sensors 18 shown in FIG. 3) on the radiator. Next, in step 1108, it is determined whether the target fill point has been reached. If so, the distribution device controller sends a signal to close the air vent in step 1110. If not, the method 1100 returns to step 1106. If the air vent has been closed in step 1110, the distribution device controller sends a signal to the cloud server that the air vent has been closed.

Figure 12:
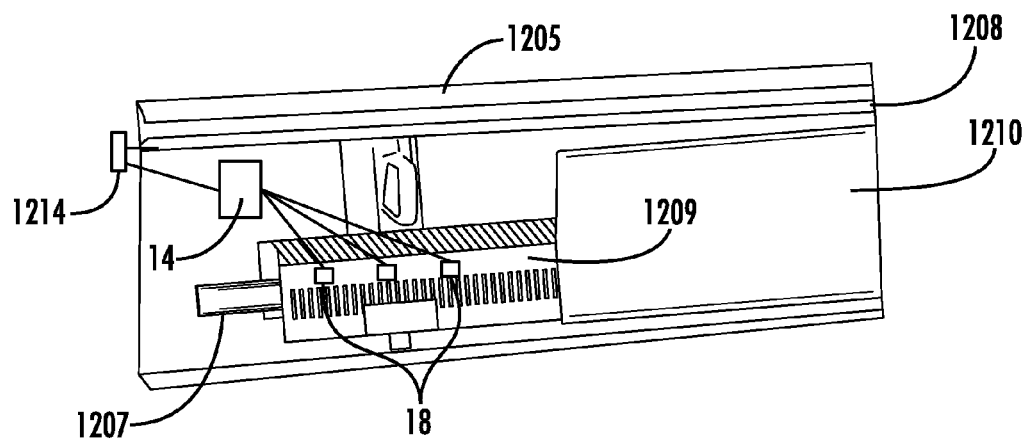
FIG. 12 is a diagram of a hydronic radiator according to some embodiments of this disclosure.

FIG. 12 is a diagram of a hydronic baseboard radiator according to other embodiments. The hydronic baseboard radiator includes a top enclosure 1205, a front panel 1210, a pipe or fluid conduit 1207, fins 1209 disposed around the pipe 1207, a damper 1208, a motor 1214, a thermal distribution device controller 14, and sensors 18. The pipe 1207 may be in fluid communication with a furnace that heats liquid and provides the liquid to the pipe 1207. The motor 1214 is coupled to the damper 1208 via a drive shaft of the motor 1214 so that when the motor is activated, the damper 1208 moves to a closed position, an opened position, or a position between the closed position and the opened position.

Sensors 18, such as temperature sensors, are disposed on the fins 1209 along a length of the pipe 1207 so that the progression of conditioned liquid through the pipe 1207 can be detected. Additionally or alternatively, liquid flow rate sensors may be disposed in the pipe 1207 to measure the flow rate of liquid passing through the pipe 1207. The controller 14 is electrically connected to the temperature sensors 18 to read temperature measurements from the temperature sensors 18 and to transmit the temperature measurements to the cloud server 13. The controller 14 is also electrically connected to the motor 1214 and drives the motor 1214 to move the damper 1208 to a desired position based on control signals received from the cloud server 13.

A furnace controller (not shown) similar to the boiler controller 16 may be electrically connected to the burner of the furnace to control the burn rate by adjusting the air/fuel ratio. In embodiments, the furnace controller may also be electrically or wirelessly connected to a liquid circulator pump disposed between the furnace and the pipe 1207. The furnace controller may control the liquid circulator pump to modulate the flow rate of the heated liquid output by the furnace and provided to the pipe 1207 based on a room temperature setpoint and the liquid flow rates measured by the liquid flow rate sensors.

In operation, the thermal distribution device controller 14 provides information regarding the progression of conditioned liquid through the hydronic baseboard radiator and transmits the progression information, which may be temperature measurements, to the cloud server 13. The cloud server 13 then generates a control signal based on the progression information and a temperature setpoint for a room, and transmits the control signal to the thermal distribution device controller 14 to control the motor 1214 to open or close the damper 1208. If the cloud server 13 determines that the room temperature measurements reach room temperature setpoints, the cloud server 13 generates a control signal that controls the liquid pump of the furnace to decrease the flow rate of the conditioned liquid provided by the furnace.

Figure 13:
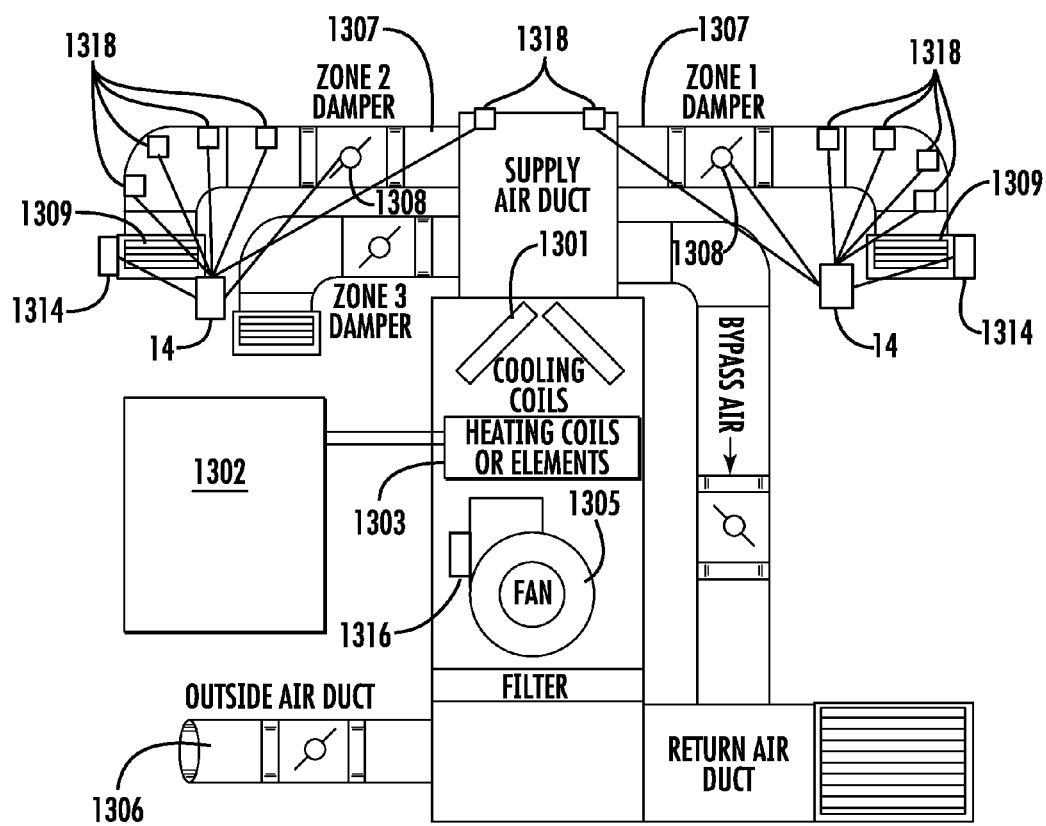
FIG. 13 is a diagram of a forced-air heating and cooling system according to other embodiments of this disclosure.

FIG. 13 is a diagram of a forced-air heating and cooling system according to other embodiments of this disclosure. The forced-air heating and cooling system includes cooling coils 1301, heating coils or elements 1303, a furnace 1302 which heats a liquid and provides the liquid to the heating coils 1303, a fan 1305, a fan controller 1316 for controlling the operation of the 1305, multiple duct branches 1307, a motorized damper 1308 in each of the duct branches 1307, diffusers 1309, motors 1314, controllers 14, and conditioned air sensors 1318. Motors 1314 are coupled to respective diffusers 1309 so that when the motors 1314 are activated, the diffusers 1309 change to a closed position, an opened position, or a position between the closed position and the opened position.

Conditioned air sensors 1318 are disposed on the duct branches 1307 along all or a portion of a length of the duct branches 1307 so that the progression of conditioned air through the duct branches 1307 can be detected. Each controller 14 is electrically connected to a group of conditioned air sensors 1318 to read temperature measurements from the conditioned air sensors 1318 and to transmit the temperature measurements to the cloud server 13. Each controller 14 is also electrically connected to a motorized damper 1308 and drives the motorized damper 1308 to a desired position between a closed position and an opened position based on control signals received from the cloud server 13.

A fan controller 1316 similar to the boiler controller 16 is electrically connected to a fan to modulate the flow rate of conditioned air output to the duct branches 1307. In operation, the thermal distribution device controller 14 provides information regarding the progression of conditioned air through the branch ducts 1307 and transmits the progression information, which may be the temperature measurements, to the cloud server 13. The cloud server 13 then generates a control signal based on the progression information and transmits a control signal to the fan controller 1316, which modulates the flow rate of conditioned air provided to the branch ducts 1307. For example, if the cloud server 13 determines that the overall progression of air through multiple duct branches 1307 decreases below a threshold, the cloud server 13 generates a control signal that controls the fan 1305 to decrease the flow rate of the conditioned air provided to the branch ducts 1307.

In embodiments, the motorized damper 1308 may be placed at the beginning or ending of a path or branch to reduce the volume of ducts for adequate distribution of the conditioned air to deliver an appropriate amount of heating or cooling where it is needed.

In embodiments, the fan 1305 may include an AC motor and the fan controller 1316 may include a variable-frequency drive (VFD) controller for controlling the AC motor speed and torque. The conditioned air sensors 1318 may sense pressure and the controller 14 may transmit the sensed pressure to the cloud server 13. The cloud server 13 may then generate and transmit a control signal to the fan controller 1316 to adjust the AC motor speed of the fan based on the sensed pressure.

It is also contemplated that a failure of the boiler can be detected or determined and reported by the steam heat modulation control system 10. A plurality of sensors may be disposed on the boiler to measure sound discrimination and vibration at the motor for the burner, and/or circulator pump motors. Indicators such as whine and high-pitched sounds may indicate a failure. Additionally, it is contemplated that sensors may be used to sense the oxygen content in the flu and the temperature of the gas in the flu or exhaust stack. Using this information, the cloud server can send signals to the boiler controller to modulate the BTU output of the boiler to match the demand of the radiators. The modulation can be accomplished using the plurality of sensors to determine the combustion chemistry of the boiler in order to manipulate the air to fuel ratio.

The modulation of the boiler may involve turning the boiler on and off. The modulation may additionally or alternatively involve modulating the boiler's burner firing rate. The firing rate may include a slow firing rate, a medium firing rate, and a fast firing rate. The firing rate may be controlled via a feedback loop, in which the fuel to air ratio is changed based on the outputs from oxygen and temperature sensors disposed in the burner.

It is also contemplated that a water meter may be disposed on the water tank to sense how much fresh water is being put into the boiler to find leaks in a particular zone of the building. It is contemplated that the foregoing may be part of comprehensive energy management system.

In some embodiments, the steam heating control system includes a server, a controller, an electro-mechanical air vent, a room temperature sensor, and steam sensors. The steam sensors are adapted to be disposed at various points on a steam radiator. The controller is electrically coupled to the steam sensors and an electro-mechanical air vent in fluid communication with the steam radiator. The controller includes a communications interface that transmits steam signals from the steam sensors to the server and the room temperature sensor includes a communications interface that transmits room temperature measurements to the server.

The server may determine whether the difference between the room temperature measurements and a temperature setpoint is greater than a threshold. If it is determined that the difference between the room temperature measurements and the temperature setpoint is greater than the threshold, the server may transmit a control signal to the controller to open the electro-mechanical air vent to allow the flow of steam into the steam radiator. The server may set a target fill point for the steam radiator based on the difference between the room temperature measurements and the temperature setpoint. The server then monitors the sensor signals to determine whether the target fill point for the radiator has been reached.

If the server determines that the target fill point for the radiator has been reached, it transmits another control signal to the electro-mechanical air vent to close the electro-mechanical air vent. The server may also determine the number of electro-mechanical air vents that are closed and transmit a control signal to a steam source of the radiators to decrease the flow rate of steam produced by the steam source based on the number of electro-mechanical air vents that are closed. If all electro-mechanical air vents associated with a steam source are closed, the server may transmit a control signal to the steam source to stop the flow of steam from the steam source, e.g., by turning off the boiler.

The steam sensors may be temperature sensors, optical temperature sensors, or strain gauges. The electro-mechanical air vent may include a pulse-latching solenoid to open and close the electro-mechanical air vent.

The systems of this disclosure may incorporate safety measures which operate at a local level in case a wireless room temperature sensor or a wireless controller for the fluid flow control device loses connection with the Internet and thus cannot communicate with the cloud server. For example, in the case of heating systems, the wireless controller may monitor for temperatures of a thermal distribution device, e.g., a steam radiator, that exceed a predetermined maximum or that drop below a predetermined minimum temperature. If the wireless controller determines that the temperature of the thermal distribution device exceeds the predetermined maximum temperature, e.g., 130° F., the wireless controller may close a valve to stop the flow of a heating fluid to a thermal distribution device. If the wireless controller determines that the temperature of the thermal distribution device exceeds the predetermined minimum temperature, e.g., 50° F., the wireless controller may open a valve to allow the flow of a heating fluid to a thermal distribution device.

The components of the systems of this disclosure may communicate with each other via wired communications, wireless communications, or a combination of wired and wireless communications.

The system of this disclosure may include a management application that runs on a user's computer, such as a mobile device, and that communicates with the cloud server 13. This application may include a user interface having buttons or other input controls that enable a user to set the temperature setpoints for individual rooms in a building. In this way, a user can set different temperatures in different rooms.

The management application may provide different levels of access for different types of users. For example, the types of users may include a tenant and a building manager. The management application may provide a user interface for the installer, which profiles the building. The building profile may include details regarding its construction, such as the size of rooms (e.g., ceiling height and volume of the rooms) and the orientation of the building and its rooms (e.g., east, north, south, and west). The building profile may also include the address of the building, the owner of the building, the company that manages the building, apartment numbers, and the corresponding number of occupants.

The management application may access a hierarchal database having a building level, an apartment level, and a room level. The distribution device control assemblies 25 and the room temperature sensors 11 may include IDs associated with each of the rooms.

In embodiments, the end-user interface may include a temperature control button or buttons, such as an "up" arrow button for increasing the temperature setpoint of a room and a "down" arrow button for decreasing the temperature setpoint of a room. The end-user interface may also provide for system-wide control by providing an array of temperature control buttons for raising and lowering temperature setpoints for each apartment.

The end-user interface may vary depending on the type of end user or their access level. The end-user interface may work from a top down level. For example, in the end-user interface for a building management company, a user can access individual temperature controllers starting from a building level, and then navigating within a zone level. If the user is not granted full access, e.g., if the user is granted access to only their apartment, the end-user interface only shows temperature control buttons for their apartment.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A steam heating control system comprising:
    a server;
    a plurality of electro-mechanical air vents adapted to be placed in fluid communication with a respective plurality of radiators disposed throughout a plurality of rooms of a building;
    a plurality of steam sensors disposed at different radiator sections of each radiator of the plurality of radiators, each plurality of steam sensors configured to sense an amount of steam in each respective radiator of the plurality of radiators;
    a plurality of room temperature sensors adapted to be disposed in a respective one of the plurality of rooms of the building, the plurality of room temperature sensors being configured to measure room temperature in each of the plurality of rooms and to transmit the measured room temperatures to the server;
    a plurality of first controllers, each of which is electrically coupled to a respective one of the plurality of electro-mechanical air vents and the plurality of steam sensors, the plurality of first controllers being configured to transmit the sensed amount of steam to the server and to control the respective plurality of electro-mechanical air vents based on respective first control signals received from the server; and
    a second controller electrically coupled to a steam source and configured to modulate the flow rate of steam output from the steam source based on a second control signal received from the server,
    wherein the server is configured to generate the first control signals based on the measured room temperatures and the sensed amount of steam in each radiator of the plurality of radiators to regulate the amount of steam in each radiator of the plurality of radiators, to determine steam requirements of each radiator of the plurality of radiators, and to generate the second control signal based on the determined steam requirements of each radiator of the plurality of radiators to regulate an amount of steam output from the steam source.

2. The steam heating control system according to claim 1, wherein each plurality of steam sensors are at least one of a plurality of temperature sensors, a plurality of optical temperature sensors, and a plurality of strain gauges.

3. The steam heating control system according to claim 1, wherein the plurality of steam sensors are disposed on each of the plurality of radiators to optimize the sensing of the amount of steam in each radiator of the plurality of radiators.

4. The steam heating control system according to claim 1, wherein each plurality of steam sensors are disposed along a a length of each respective radiator of the plurality of radiators and at different heights corresponding to a predetermined path of steam through each respective radiator of the plurality of radiators.

5. The steam heating control system according to claim 1, wherein each plurality of steam sensors are disposed along a length of each respective radiator of the plurality of radiators and at different heights corresponding to a temperature gradient along the length of each respective radiator of the plurality of radiators.

6. The steam heating control system according to claim 1, wherein the server is a cloud server and the plurality of controllers and the plurality of room temperature sensors are in wireless communication with the cloud server.

7. The steam heating control system according to claim 1, wherein the steam source is a boiler, a pipe providing steam from a public utility or a steam plant, or thermal solar panels.

8. The steam heating control system according to claim 1, wherein the electro-mechanical air vent includes a pulse-latching solenoid.

9. The steam heating control system according to claim 1, wherein at least one of the plurality of controllers includes at least one battery.

10. The steam heating control system according to claim 9, wherein the at least one battery is a rechargeable battery electrically coupled to a thermoelectric generator in thermal communication with at least one of the plurality of radiators.

11. A steam heating control system comprising:

an electro-mechanical air vent adapted to be placed in fluid communication with a radiator disposed in a room;

a plurality of steam sensors adapted to be disposed at different locations on the radiator, the plurality of steam sensors configured to sense an amount of steam in the radiator;

a temperature sensor adapted to be disposed in the room, the temperature sensor being configured to measure room temperature in the room;

a first controller electrically coupled to the electro-mechanical air vent and the plurality of steam sensors, the first controller being configured to control the electro-mechanical air vent based on room temperature measured by the temperature sensor and the sensed amount of steam in the radiator to regulate the amount of steam in the radiator; and a second controller electrically coupled to a steam source and configured to regulate the amount of steam generated by the steam source based on the amount of steam measured by the plurality of steam sensors.

12. The steam heating control system according to claim 1, wherein the plurality of steam sensors are disposed along a length of the radiator and at different heights corresponding to a path of steam through the radiator.

13. The steam heating control system according to claim 1, wherein the plurality of steam sensors are disposed along a length of the radiator and at different heights corresponding to a temperature gradient along the length of the radiator.

14. The steam heating control system according to claim 13, wherein the electro-mechanical air vent includes a pulse-latching solenoid.

\* \* \* \* \*